United States Patent
Abou-Sayed

(10) Patent No.: US 12,460,512 B1
(45) Date of Patent: Nov. 4, 2025

(54) INJECTING DISSOLVED CARBON DIOXIDE INTO A SUBTERRANEAN FORMATION

(71) Applicant: Advantek Waste Management Services, LLC, Houston, TX (US)

(72) Inventor: Omar Abou-Sayed, Houston, TX (US)

(73) Assignee: Advantek Waste Management Services, LLC, Houston, TX (US)

( * ) Notice: Subject to any disclaimer, the term of this patent is extended or adjusted under 35 U.S.C. 154(b) by 0 days.

(21) Appl. No.: 18/866,407

(22) PCT Filed: May 15, 2023

(86) PCT No.: PCT/US2023/067024
§ 371 (c)(1),
(2) Date: Nov. 15, 2024

(87) PCT Pub. No.: WO2023/225486
PCT Pub. Date: Nov. 23, 2023

Related U.S. Application Data

(60) Provisional application No. 63/342,146, filed on May 15, 2022.

(51) Int. Cl.
*E21B 41/00* (2006.01)
*E21B 43/16* (2006.01)

(52) U.S. Cl.
CPC ........ *E21B 41/0064* (2013.01); *E21B 43/164* (2013.01)

(58) Field of Classification Search
CPC .................................................. E21B 41/00
See application file for complete search history.

(56) References Cited

U.S. PATENT DOCUMENTS

| | | | |
|---|---|---|---|
| 8,096,934 B2 | 1/2012 | Koide et al. | |
| 8,518,645 B2 | 8/2013 | Minter et al. | |
| 10,569,956 B1 | 2/2020 | Keshner et al. | |
| 11,230,473 B2 | 1/2022 | Sant et al. | |
| 2010/0170674 A1 | 7/2010 | Blount et al. | |
| 2011/0056373 A1* | 3/2011 | Baxter | B01D 53/62 95/213 |
| 2017/0037716 A1 | 2/2017 | Kohlik | |
| 2021/0381758 A1* | 12/2021 | Dodson | B01D 53/002 |

(Continued)

FOREIGN PATENT DOCUMENTS

| | | |
|---|---|---|
| BR | 102016000013 A2 | 7/2017 |
| BR | 102016000704 A2 | 11/2017 |
| BR | 112013032664 B1 | 7/2020 |

(Continued)

OTHER PUBLICATIONS

International Search Report and Written Opinion of the International Search Authority for corresponding PCT Application PCT/US2023/067024, dated Sep. 15, 2023, 6 pages.

(Continued)

*Primary Examiner* — William D Hutton, Jr.
*Assistant Examiner* — Avi T Skaist
(74) *Attorney, Agent, or Firm* — Booth Albanesi Schroeder PLLC; Peter V. Schroeder

(57) ABSTRACT

A method of sequestering carbon uses a mixed component gas that includes carbon dioxide, dissolves the carbon dioxide in a liquid under pressure, and pumps the resulting carbonated liquid into a subterranean formation.

8 Claims, 1 Drawing Sheet

(56) References Cited

U.S. PATENT DOCUMENTS

2023/0311052 A1* 10/2023 Song .................. C10L 3/108
96/420

FOREIGN PATENT DOCUMENTS

CN        204436341 U    7/2015
WO      2008058298 A1    5/2008

OTHER PUBLICATIONS

Brazil Patent Office, Technical Examination Report (Notice 7.1), May 8, 2025 (English translation, not verified), pp. 1-7.
BR 102016000704 A2 (English translation, not verified), Nov. 21, 2017.

* cited by examiner

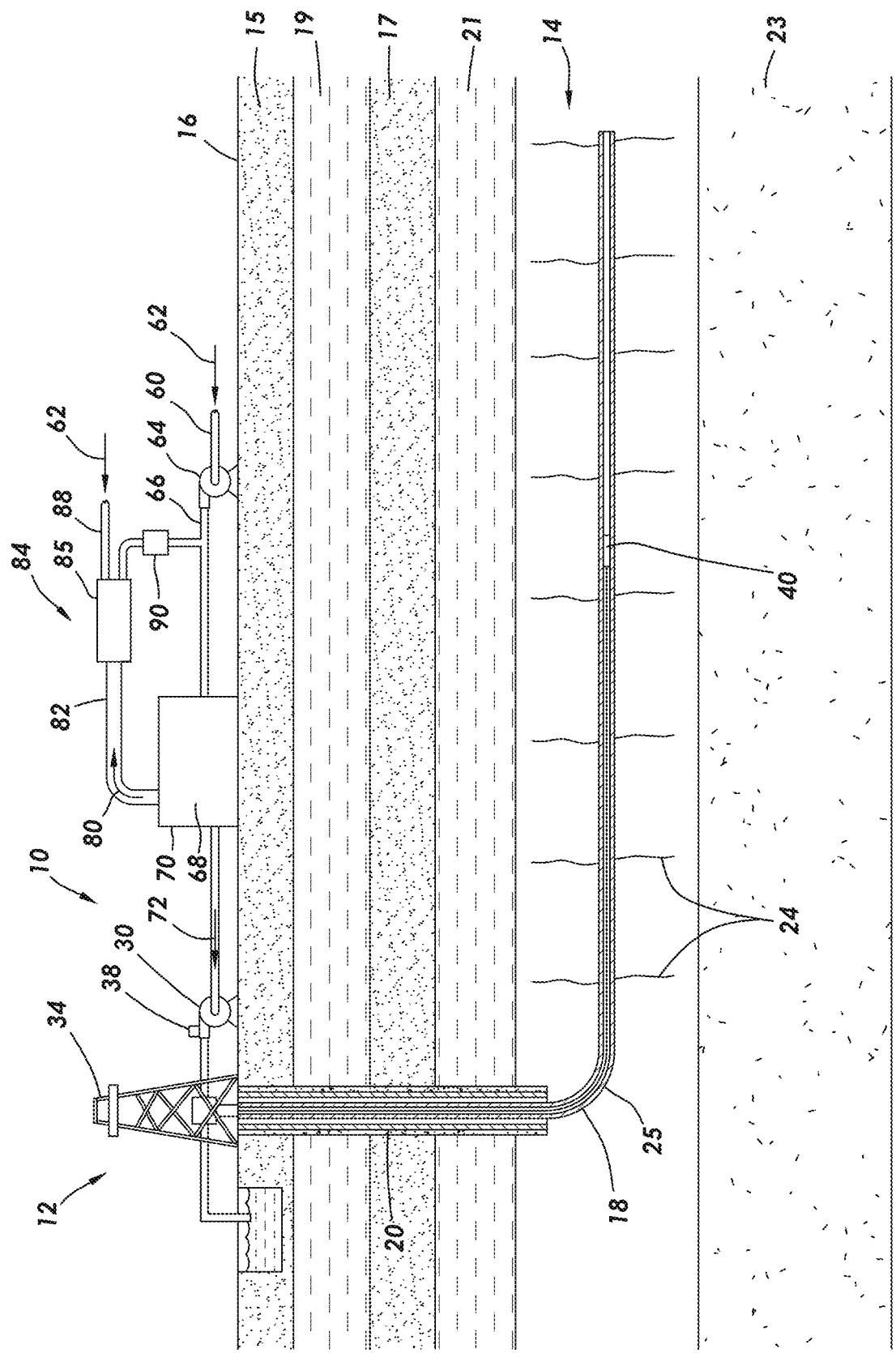

INJECTING DISSOLVED CARBON DIOXIDE INTO A SUBTERRANEAN FORMATION

CROSS-REFERENCE TO RELATED APPLICATIONS

This is an International Application for Patent filed under the PCT and claims priority to U.S. Provisional Patent Application Ser. No. 63/342,146, filed May 15, 2022.

FIELD

The disclosed methods and apparatus generally relate to disposal of carbon dioxide in a subterranean formation. More specifically, the disclosure relates to methods for dissolving carbon dioxide waste into a liquid for injection into a subterranean formation.

BRIEF DESCRIPTION OF THE DRAWING

For a more complete understanding of the features and advantages of the present disclosure, reference is now made to the detailed description of the disclosure along with the accompanying FIGURES in which corresponding numerals in the different FIGURES refer to corresponding parts and in which:

FIG. 1 is a schematic of an exemplary injection operation for injecting carbonated liquid into a subterranean formation, shown in partial cross-section, according to an aspect of the invention.

DETAILED DESCRIPTION

The rising environmental and health concerns caused by an increase in greenhouse gas concentration in the atmosphere and resulting climate change has led to a recognized goal of curbing the level of such gases in the atmosphere and to generally reducing the amount of carbon from the environment.

Carbon Capture and Storage (CCS) has gained attention along with other techniques to curb the greenhouse gas levels. With $CO_2$ accounting for the bulk of greenhouse gas, managing $CO_2$ is of particular concern. Typical CCS technology involves capturing $CO_2$ from anthropogenic or natural sources, compressing it for transportation to an injection site, and injecting it into a pre-selected deep geological formation where it stays for permanent storage, also known as carbon sequestration. Sequestration is the technique in which $CO_2$ is stored in underground structures, like saline aquifers, depleted oil and gas reservoirs, and un-mincable coal beds.

Disclosed herein is a system for the reduction of carbon dioxide in the atmosphere by dissolving carbon dioxide into a liquid, such as water, and injecting the carbon dioxide laden liquid into a subterranean formation for sequestration.

FIG. 1 is a schematic of an exemplary onshore drilling rig and wellbore, in cross-section, according to an aspect of the invention, the system generally designated 10. Rig 12 is positioned over a subterranean formation, below the earth's surface 16, having multiple layers or zones with varying geological properties. The target formation zone 14 is targeted for carbon dioxide ($CO_2$) disposal or sequestration and has corresponding properties allowing the injection, movement, and storage of fluids. The containment zone 21, above the target zone 14, conversely, has properties preventing the flow of fluids and is useful for containing carbon dioxide, and other fluids, present in the target zone 14 from migrating upwards into or past the containment zone 21. Additional zones 15, 17 and 19, can have various properties. For example, in many locations an underground source of drinking water, such as fresh water zone 19 may be present.

The rig 12 is exemplary to generally indicate surface equipment necessary for performing pumping at pressure into the target formation. Such equipment can be used for various operations, such as injection, wellbore flushing, disposal or storage, etc. The rig 12, as shown, can include a derrick 34 for supporting a hoisting apparatus for raising and lowering pipe strings, such as work strings, production strings, and casing 20. Similarly, coiled tubing and wireline operations can be run in the well. Pump 30 is capable of pumping a variety of wellbore compositions of various consistencies into the well. One or more pressure measurement devices 38 provide pressure readings, for example, at the pump discharge, wellhead, primary and annular bores, etc.

Wellbore 18 has been drilled through the various earth strata, including formation zone 14. Upon completion of drilling, a casing 20 is typically cemented in place in the wellbore 18 to facilitate the production of oil and gas from the targeted formation 14 while isolating non-targeted formations such as, for example, an aquifer formation 19. The targeted formation zone 14 is bounded above and below by containment layers 21 and 23. The targeted zone 14 can be a saline aquifer as saline aquifers have properties necessary to inject, allow subterranean movement of, and store large volumes of $CO_2$. It is understood that the aquifer can have additional fluid components present therein.

Casing 20 extends downhole along wellbore 18 through a selected section of the wellbore. As shown, the casing 20 extends along the vertical section of the wellbore, although casing can also be positioned along the horizontal section if desired. The casing annulus between the casing 20 and wellbore 18 contains cement to secure the casing 20 in place and prevent leakage upwards on the outside of the casing. If casing is used along the target zone, the casing can be pre-perforated or perforated in place using typical perforation techniques. More often, a liner 25 is positioned in the wellbore, extending or hung from the casing. The liner 25, at the target zone, is pre-perforated, slotted, or perforated at its downhole location. The perforations provide fluid communication between the target zone 14 and the wellbore 18 interior to the casing or liner. Alternately, the wellbore at the target zone can be open hole. A tubing annulus is formed between the casing or liner and any work string positioned therein. An exemplary downhole tool assembly 40 is shown in the wellbore 18 and can be one or more downhole tools, connected or disconnected, on a wireline, workstring, or other conveyance, or permanently installed in the wellbore. For example, the tool assembly 40 can include an array of sensors for data acquisition and transmission.

In some embodiments, the methods are used with respect to a target zone which has been previously hydraulically fractured, creating exemplary cracks 24. The fractures can intersect one another, creating a connected fracture network. In some cases, multiple sections of the target zone are injected, sometimes sequentially, and can be fluidly isolated from one another to allow, in conjunction with isolation or barrier devices, downhole valves, and the like, control of fluid communication with each section of the zone.

Generally, the system calls for dissolving carbon dioxide in a liquid and injecting the carbon dioxide laden fluid into a subterranean formation for sequestration.

In an embodiment, the carbon dioxide is part of a mixed gas source. For example, the mixed gas source can comprise common air, having carbon dioxide, nitrogen, oxygen and additional naturally occurring gases. The mixed gas source can also be a waste gas from an industrial source, comprising carbon dioxide along with other gases, harmful and benign. For example, ethanol plants emit immense amounts of waste carbon dioxide. The waste carbon dioxide can include additional gases as part of a gaseous mix. Alternately, the carbon dioxide source can effectively comprise exclusively CO2.

The carbon dioxide gas or gaseous mix can be transported to the well site by known means. In an embodiment, the carbon dioxide gas, with or without other constituents, is piped to the site. The transported gas can be in gaseous or supercritical phase during transport.

In an embodiment, the carbon dioxide (or mixed component gas) can be mixed with other gases, such as air, using procedures and equipment known in the art.

In an embodiment, the source gas is a mixed component gas comprising carbon dioxide and at least one other gas. In such a case, the mixed component gas is input into the system at an inlet 60. The inlet gas 62 is pressurized at a pressurization device 64 or devices, as is known in the art. The pressurized, mixed component gas is output from the pressurization device at an outlet 66.

The pressurized gas is comingled with pressurized liquid 68, such as in a pressurized tank 70 or the like, as is known in the art. The pressure of the pressurized liquid is such that the carbon dioxide in the mixed component gas dissolves into the liquid. The non-carbon dioxide gases in the mixed component gas may not dissolved in the liquid (or dissolve only in de minimis amounts). For example, the solubility of carbon dioxide in water is greater than that of many typical gases, such as oxygen and nitrogen, at a given pressure and temperature.

The liquid, in an embodiment is water or a water-based fluid. The water-based fluid can be potable water, brine, saline water, or a contaminated water-based fluid, such as with waste-bearing fluid. In an embodiment the liquid is waste fluid, or segregated portions thereof, from hydrocarbon recovery wells. The liquid can alternately be waste liquid from other industrial sources. The liquid can be any CO2 solvent.

The now carbonated liquid 72 is pumped, such as by pump 34, into the injection well and into the target formation 14. It is understood that other processes can occur prior to or as part of the injection process, that additional fluids can be added to the carbonated liquid, that the liquid can be further pressurized and the like. The carbonated liquid may undergo phase change in some operations. The carbonated liquid is sequestered in the formation, thereby removing the carbon dioxide from the above-ground environment.

As explained above, the mixed component gas had carbon dioxide removed by dissolving CO2 into the liquid. The non-carbon dioxide gases do not dissolve, or dissolve at a lower rate or to a lesser extent than the carbon dioxide. The now-decarbonated gas has much lower percentage of carbon dioxide than the original mixed component gas. The decarbonated gas separates from the liquid and is recaptured. For example, the decarbonated gas 80 can be captured and removed from the liquid, such as through outlet pipe 82.

A pressure recovery system is provided to capture and utilize the still pressurized non-carbonated gas. The pressure recovery system can use a turbocharger or a pressure exchanger, for example, as is known in the art. The decarbonated gas is still at elevated pressure from the pressurization process when it is recaptured. A pressure recovery system 84, such as is known in the art, utilizes the pressure remaining in the decarbonated gas 80 and transfers the pressure to, and pressurizes, incoming mixed component gas 62. For example, with a pressure exchanger, the still pressurized non-carbonated gas 80 is fed through outlet 82 to a pressure exchanger 85 where it pressurizes incoming mixed component gas 60 fed to the exchanger at inlet 88. The now pressurized mixed component gas is then fed into the high-pressure mixed component gas stream. A circulation pump 90 can be employed to operate the pressure exchanger gas loop.

The net energy required to run the air compressor, liquid compressor, and pumps can come from a renewable energy source.

In use, the system can be applied to an existing injection well that injects water or water-based fluids and, in an efficient manner, utilize carbon capture and sequestration. The system can be used to sequester carbon dioxide waste from various sources, such as industrial waste. In some embodiments, the carbon dioxide source gas has a relatively low concentration of carbon dioxide, for example, air. Consequently, the system's efficiency depends on the ability to move and pressurize large volumes of air. A high-efficiency pressure recovery system is consequently used in the system. In other embodiments, the carbon dioxide source gas can be concentrated, such as from industrial waste gas.

The system can further include additional processes to isolate the bulk gasses, for example by selective membrane or selectively reactive surface.

Words and terms herein have their plain, ordinary meaning in the field of this disclosure unless explicitly and clearly defined or unless specific context requires a different meaning. If there is conflict in the usages of a word in this disclosure and one or more patent(s) or other documents incorporated by reference, definitions consistent with this specification apply.

While the written description enables one of ordinary skill to make and use the embodiments discussed, those of ordinary skill will understand and appreciate the existence of variations, combinations, and equivalents of the specific embodiments, methods, and examples herein. The disclosure should therefore not be limited by the above-described embodiments and examples.

The embodiments disclosed above are illustrative, as the present disclosure may be modified and practiced in different but equivalent manners apparent to those skilled in the art having the benefit of the teachings herein. The illustrative embodiments disclosed may be altered or modified and such variations are considered taught by the present disclosure. The disclosed elements or steps can be combined or practiced together in various combinations or sub-combinations to increase the efficiency and benefits of the disclosure. The disclosed embodiments may be combined with one or more of the other disclosed embodiments, unless explicitly stated otherwise. Furthermore, no limitations are intended to the details of construction, composition, design, or steps disclosed, other than as described in the claims. The description and drawings of the specific examples herein do not point out what an infringement of this patent would be, but are to provide at least one explanation of how to make and use the disclosure. The limits of the embodiments of the present disclosure and the bounds of the patent protection are measured by and defined in the following claims.

It is claimed:

1. A method of sequestering carbon in a target zone of a subterranean formation, the method comprising:
   compressing a mixed component gas comprising a carbon dioxide gas and at least a second gas;

mixing the compressed mixed component gas with pressurized liquid;

dissolving at least a portion of the carbon dioxide gas into the pressurized liquid, creating a carbonated liquid;

separating at least some of the second gas from the carbonated liquid, the separated second gas at a pressure above atmospheric pressure;

flowing the separated second gas to a pressure recovery system;

using the separated second gas to pressurize a mixed component gas for mixing with pressurized water; and injecting the carbonated liquid into a subterranean target zone.

2. The method of claim 1, wherein the mixture of pressurized liquid and mixed component gas are at a pressure selected to dissolve carbon dioxide in the water.

3. The method of claim 1, wherein the at least one second gas of the mixed component gas comprises at least one of nitrogen, oxygen and hydrogen.

4. The method of claim 1, wherein the pressure recovery system comprises a turbocharger or a pressure exchanger.

5. The method of claim 1, further comprising: pressurizing the carbonated liquid prior to injecting the carbonated liquid into the subterranean target zone.

6. The method of claim 1, wherein mixing the mixed component gas with pressurized liquid further comprises mixing the mixed component gas with a water-based fluid.

7. The method of claim 1, wherein mixing the mixed component gas with pressurized liquid further comprises mixing the mixed component gas waste water from a hydrocarbon well.

8. The method of claim 1, wherein compressing a mixed component gas comprising a carbon dioxide gas and at least a second gas, further comprises compressing carbon dioxide waste from an industrial source.

\* \* \* \* \*